United States Patent [19]
Werner

[11] 3,715,893
[45] Feb. 13, 1973

[54] TEMPERATURE CONTROL SYSTEM FOR FREEZERS

[75] Inventor: Bernfried M. Werner, Pompano Beach, Fla.

[73] Assignee: Louis A. M. Phelan, Pompano Beach, Fla.

[22] Filed: March 25, 1971

[21] Appl. No.: 127,886

[52] U.S. Cl. ...................62/135, 62/180, 62/202, 62/392
[51] Int. Cl. ...............................F25c 7/10
[58] Field of Search..............62/135, 180, 392, 202; 236/68 B

[56] References Cited

UNITED STATES PATENTS

| 2,930,203 | 3/1960 | Koch | 62/135 |
| 3,183,681 | 5/1965 | Lutz et al. | 62/342 X |
| 3,517,524 | 6/1970 | Fiedler | 62/135 X |

*Primary Examiner*—William E. Wayner
*Attorney*—James E. Nilles

[57] ABSTRACT

A temperature control system for freezer mechanism of the continuous freezing type and in which various combinations of ingredients are fed into a freezing chamber and frozen. A scraper slowly rotates over the inner surface of the chamber to remove the frozen mix from the surface of the cylinder. The freezing chamber is pressurized and the product forced out of a serving valve at one end of the freezer and the temperature of the product is sensed and is used to control the refrigeration means. A heat anticipator is also energized during the draw and heats the sensing means so that the need for refrigeration is anticipated prior to the time it is actually required, thereby eliminating any time lag in supplying refrigeration.

2 Claims, 5 Drawing Figures

INVENTOR:
B. M. WERNER

BY: James E. Nilles
ATTORNEY

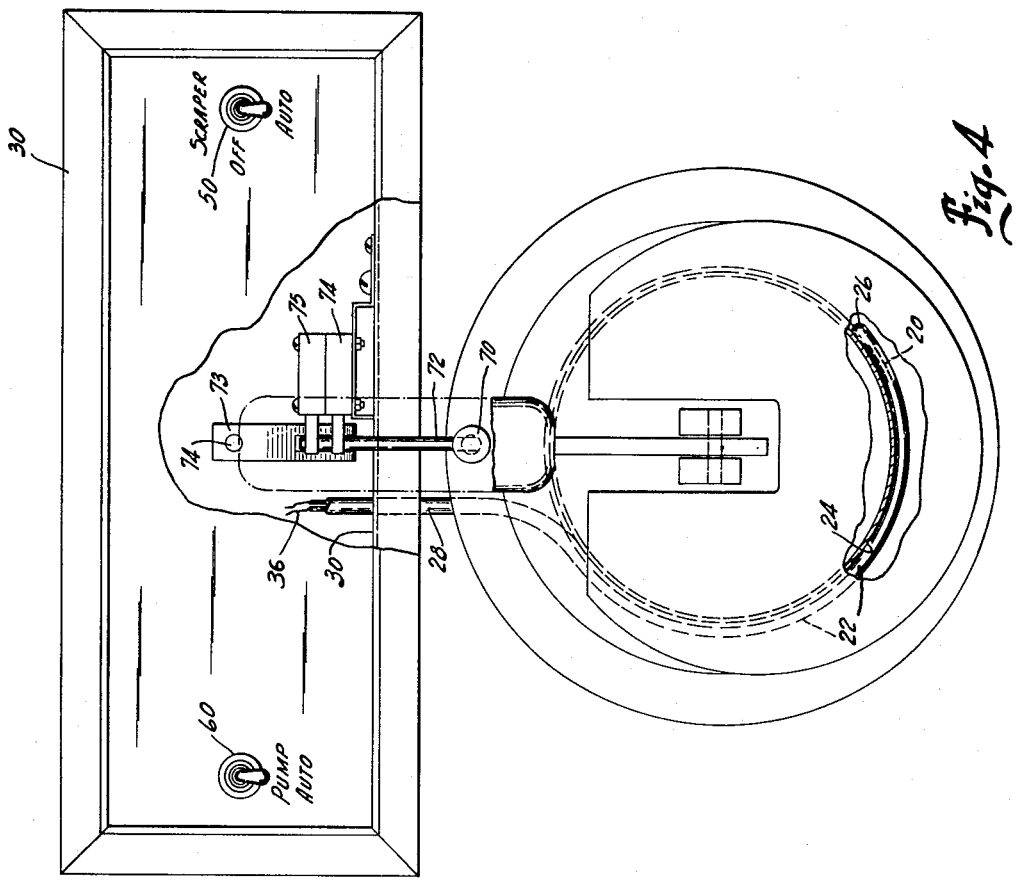
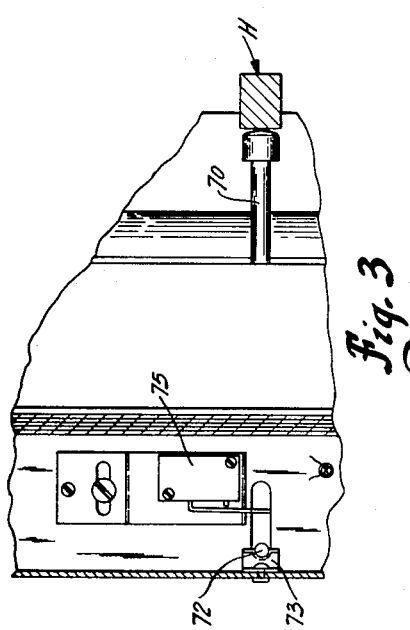
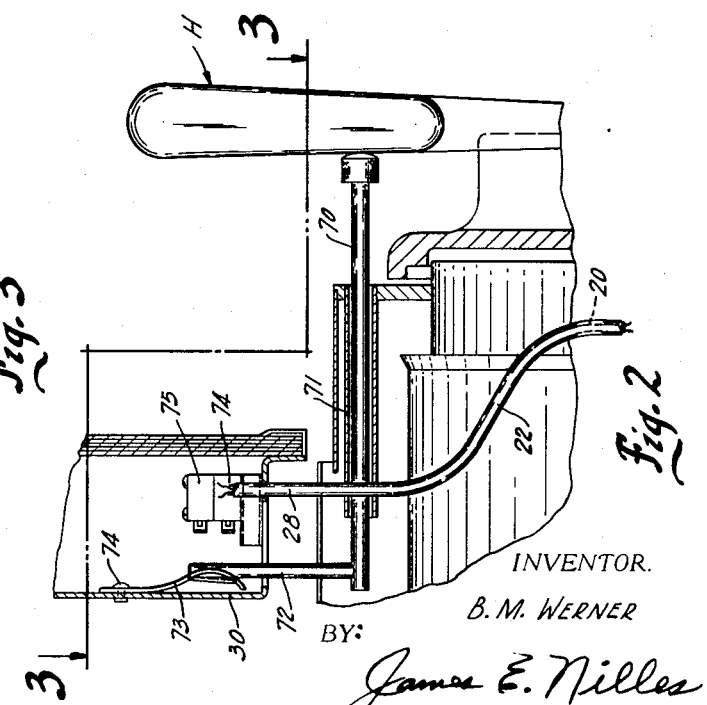
INVENTOR.
B. M. WERNER
BY: *James E. Nilles*
ATTORNEY

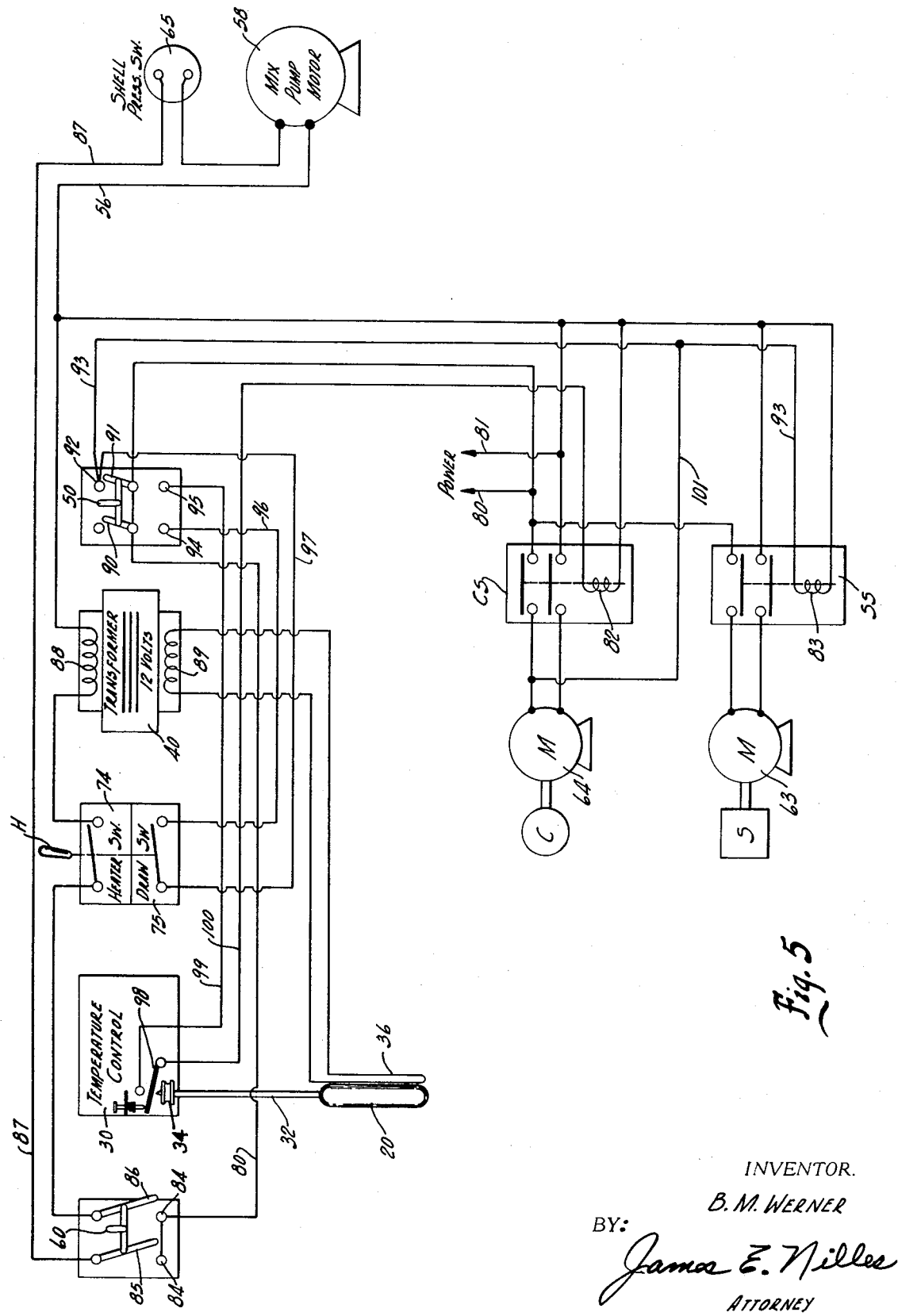

TEMPERATURE CONTROL SYSTEM FOR FREEZERS

BACKGROUND OF THE INVENTION

The invention pertains to refrigeration equipment and more specifically to an automatic control mechanism which is actuated by the temperature of the congealed, removable product.

The present invention is an improvement over the temperature control system shown in the U.S. Pat. No. 2,930,203, issued Mar. 29, 1960 to L. E. Koch, and entitled "Temperature Control System for Freezers." In that prior art device, a beater was used for forcibly ejecting the product one end of the freezing cylinder and also acted to aerate the product, that is to beat the required amount of air into the product to provide what is known as "over run." That beater rotated at such a speed to create undesirable heat within the freezing chamber.

SUMMARY OF THE INVENTION

The present invention provides a temperature control system for a continuous freezer in which the product is discharged from the cylinder due to the fact that the cylinder is pressurized. More specifically, the freezer includes a pump for furnishing a product mix under pressure to the freezing chamber and maintains the freezing chamber sufficiently pressurized so that the product is discharged from the freezer by pressure whenever the draw-off valve is open. This pump is operated by a pressure switch located in the freezing cylinder. A rotatably scraper is coupled electrically to the refrigerant means to simultaneously slowly move over the surface of the cylinder and remove the mix from the cooled surface. The present invention provides a temperature control system for such a freezer, which system has a temperature sensing element located in the critical area of the freezer adjacent the draw-off valve, and also includes a heater for the sensor which serves to anticipate refrigeration requirements and heat the sensor during each draw so that refrigeration commences prior to the time it would otherwise be called for by the sensor alone. The arrangement is such that the sensor is also being heated by the heater while the refrigerant is being supplied, and consequently, when the freezer is operative and a large amount of product is being drawn off, the refrigeration will not shut off when a colder batch of product that was located in the center of the freezer, passes over the heat sensor at the discharge end of the cylinder.

The control system also includes an actuator rod that is actuated by movement of the draw off valve, and which rod, through suitable switches, causes actuation of the motor for the rotatable scraper in the cylinder and also causes actuation of the temperature control.

The present invention provides a control system in which the rotatable scraper in the freezer can also run independently and regardless of whether the refrigerant compressor is on, so as to be able to clean out the freezer when the refrigeration is not desired. In the device of the present invention, the scraper could be inoperative and it would still be possible to get the product out of the freezer because of the pressurization thereof.

With the control system above mentioned, the freezer after a stand-by condition for a period of time may have the product temperature in the entry and discharge ends of the freezer different than the temperature in the center of the freezer. Then, if a considerable amount of product is drawn out of the cylinder, the control system prevents an undesirable shut-off of the refrigerant compressor in the event the colder product in the center of the freezer moves over the sensor element located in the discharge end of the freezer.

These and other objects and advantages of the present invention will appear hereinafter as this disclosure progresses, reference being had to the accompanying drawings.

BRIEF DESCRIPTION OF THE DRAWINGS

FIG. 2 is an enlarged, fragmentary cross sectional view of a portion of the device shown in FIG. 1;

FIG. 3 is a plan view of the device shown in FIG. 2;

FIG. 4 is a front view of the device shown in FIG. 2 and also showing the pump automatic switch and scraper refrigeration automatic switch; and FIG. 5 is an electrical circuit diagram used with the present invention.

DESCRIPTION OF A PREFERRED EMBODIMENT

Figure 1:
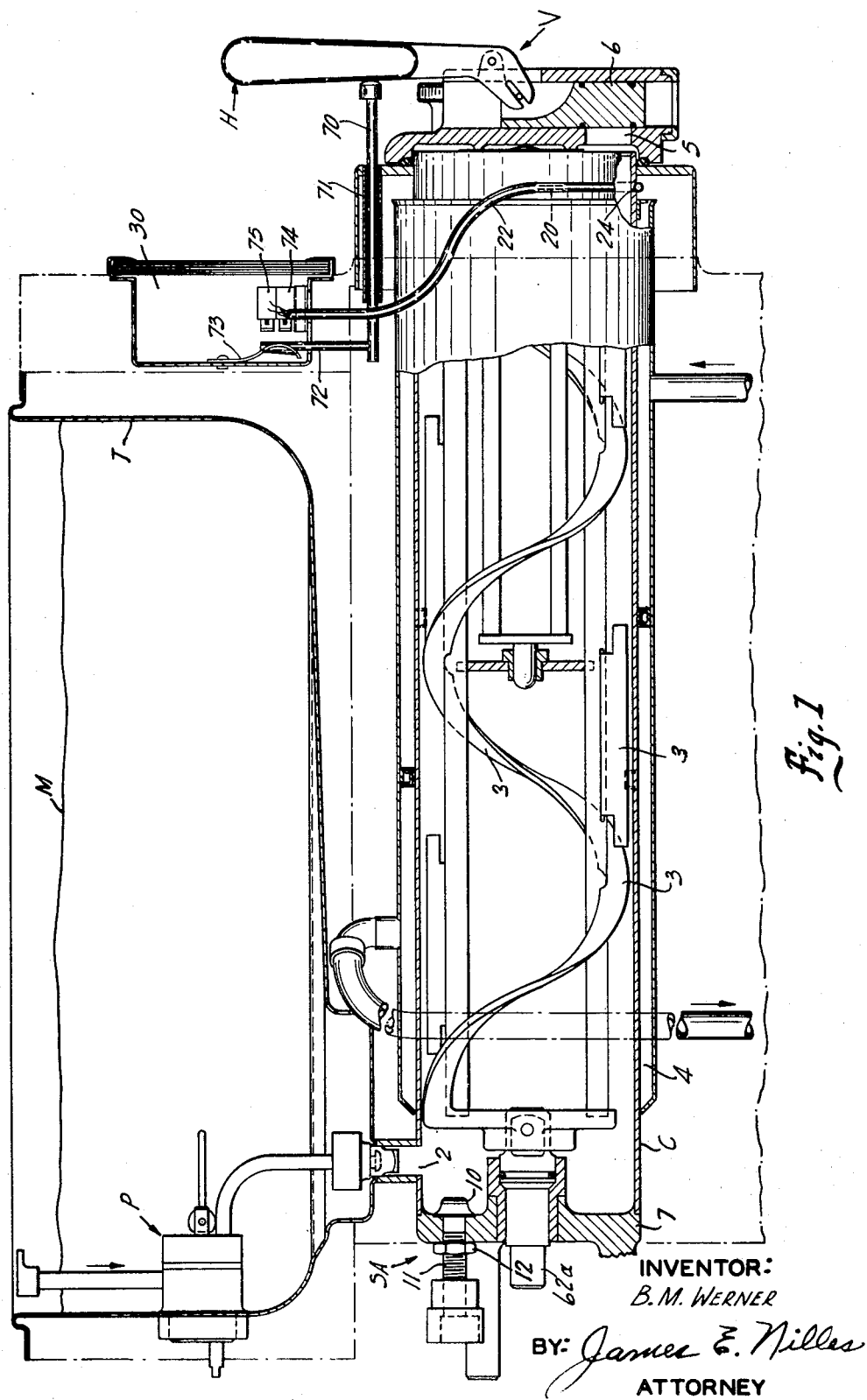
FIG. 1 is a longitudinal, partial cross sectional view through a continuous freezer embodying the present invention.

Referring in greater detail to FIG. 1, the continuous freezer includes a freezing cylinder C, a fresh mix tank T containing mix M, a pump P mounted in the tank T for mixing air and mix M together and forcing it into the freezing cylinder via opening 2. The freezing cylinder also includes a rotary scraper assembly 3 and a draw off valve V at the front end of the freezer. The cylinder furthermore includes an annular freezer chamber 4 located for substantially the full length of the cylinder C.

If a more complete description of the pump P is believed to be either necessary or desirable, reference may be had to the U.S. application, Ser. No. 59,191, filed July 29, 1970 and entitled "Positive Displacement, Gear Type Pump."

If a more complete description of the draw off valve is believed to be either necessary or desirable, reference may be had to the U.S. application, Ser. No. 59,100, filed July 29, 1970 and entitled "Freezer Door and Draw Off Valve for a Continuous Freezer."

If a more complete description of the scraper assembly 3 is believed to be either necessary or desirable, reference may be had to the U.S. application, Ser. No. 59,099, filed July 29, 1970 and entitled "Scraper Assembly and Material Retarder for a Cylindrical Continuous Freezer."

For purposes of the present invention, it is believed sufficient to say that the freezing cylinder receives the mix via opening 2, and the rotating scraper assembly keeps the product from freezing on the cylinder wall. The interior of the cylinder is pressurized by the pump P so that the product is forcefully ejected through the outlet 5 at the draw off end of the freezing cylinder when the plunger 6 of the valve is raised. If excessive pressure is present in the cylinder when the draw off valve is open, the product is ejected too rapidly. Furthermore, it is dangerous for excessive pressure to be present in the cylinder, for example, if the pump were continuously operated with the on-off switch for causing pump operation in the "on" position. Sufficient pressure must be maintained in the cylinder when the draw off valve is opened for any appreciable length of time, or is opened repeatedly in rapid succession for repeated draws of product. On the other hand, when the draw off valve is repeatedly opened and sufficient pressure is present within the cylinder, the pump should not be operated even though the on-off switch for the pump is in the "on" position.

A pressure control switch assembly SA is mounted in the rear wall 7 of the freezing cylinder and has a head 10 which is located within the cylinder and is exposed directly to the product therein. The switch assembly includes a threaded portion 11 which extends through the wall 7 and has a nut 12 threadably engaged on portion 11 and by means of which the head 10 can be drawn up tightly against the interior of the wall 7. In this manner, the switch assembly is rigidly mounted to the rear wall. If a more complete description of the switch assembly SA is deemed to be either necessary or desirable, reference may be had to the U.S. application, Ser. No. 59,192 filed July 29, 1970 and entitled "Pressure Sensitive Switch Assembly." Reference will also be made later to the function and operation of the switch assembly SA in connection with the circuit shown in FIG. 5 of the present invention.

The sensor 20 and heater 36 located at the discharge, lower end of the freezing cylinder will now be described.

The sensor 20 includes a conventional thermobulb which is located in heat conductive tube 22, which tube in turn is located in a groove 24 (FIG. 1) that is formed in the periphery of the lower discharge end of the freezer cylinder wall. This tube 22 is soldered or otherwise fixed in intimate contact to the cylinder and thus in good heat transferring relationship therewith. The tube 22 is closed at its end 26 while its upper end 28 extends upwardly over the freezing cylinder and terminates in a control box 30 located above the cylinder. The sensor 20 includes a tube 32 which extends through tube 22 and terminates in box 30. Sensor 20 and tube 32 contain a thermal expansive fluid which provides a controlled expansion and contraction of a bellows 34, or the like for actuating a spring loaded switch 98 as shown in FIG. 5. Also located within the tube 22 and lying along side the thermobulb of the sensor 20, is a heater 36 in the form of a high resistance wire that also extends upwardly through the tube 22 and is connected to the secondary of the transformer 40. It will be noted that the heater 36 simply lies alongside the thermobulb and can be easily removed from the tube without removal of the bulb. The thermobulb of sensor 20 acts to sense the temperature of the product that is located in the critical area of the cylinder just inside the draw off valve. Ordinarily, the sensor, when it is warmed sufficiently by the product, would call for the refrigeration to commence. The purpose of the heater 36 is to heat the sensor 20 and thus cause actuation of the refrigeration means, even though the product in the critical area is not cold enough to do so. In other words, the heater anticipates freezing requirements of the freezer, as will more fully appear.

Also connected in the temperature control circuit shown in FIG. 5, is a double pole, double throw switch 50, which as shown in FIG. 4, is located on the front of the machine within easy reach of the operator. The toggle switch 50 can be moved to either a scraper operating position or an automatic refrigerant position as will appear. Also located in the circuit is a double pole, single throw toggle switch 60, which as shown in FIG. 4, is also within easy reach of the operator standing at the front end of the machine. This automatic pump switch 60 can be moved between an "off" position and an automatic pump position, as will appear.

The freezer has a rotatable scraper 3 mounted within it, as fully described in the said U.S. application Ser. No. 59,099 and this scraper is slowly driven from the rear end of its shaft 62a by the scraper motor 63 (FIG. 5).

Referring to FIGS. 2, 3 and 4 in particular, a plunger 70 is slideably mounted in a tube 71 in the front of the machine and its outer end abuts against the draw off valve handle. A vertically extending post 72 is rigidly attached to the rear end of plunger 70 and extends upwardly therefrom. A leaf spring 73 is fastened at one end by a screw 74 to the frame of the machine and acts to bias the plunger 70 outwardly to a position in which it abuts against the draw off valve handle. When the draw off valve handle is swung outwardly away from the machine to draw product from the serving valve, the post 72 contacts the plungers of micro-switches 75 and 76. Micro-switch 75 closes when the draw off valve is open and provides electrical power to the transformer 40, thus heating the sensor 20 regardless of whether refrigerant is being supplied. Micro-switch 76 is also closed when the draw off handle is moved to dispense the product, and this micro-switch 76 then actuates the motor 63 of the rotary scraper 3.

Referring particularly to FIG. 5, a schematic circuit is shown interconnecting the various controls for the mix pump motor 58, the scraper motor 63, and the compressor motor 64 including a pressure control switch 65 of switch assembly SA. In FIG. 5, the several motors and controls are interconnected to a common set of power lines 80 and 81 with line 80 shown as the positive or hot side and line 81 forming a common or neutral return. In an actual construction, separate power supplies may be provided for the operation of the motors and for the inter-related control circuitry, as presently described. The compressor motor 64 is connected to the power lines through a compressor starter CS including a winding 82 for selectively closing associated contacts to complete the circuit. The scraper motor 63 is similarly connected to the power lines 80 and 81 by a scraper starter SS having a control winding 83 which, upon energization, completes the circuit to the scraper motor 63. The mix pump motor 58 is directly powered from the power lines 81-82 through the toggle switch 60. In the illustrated embodiment of the invention, the toggle switch 60 is shown as a double pole, single throw unit having a pair of contacts 84 connected in common to each other and to the power line 80. The toggle switch further includes a pair of movable contact poles 85 and 86 which are ganged and interconnected to the toggle switch 60 for simultaneous positioning between the off position and the automatic drive position in engagement with the contacts 84. The contact arm 85 is connected via a lead 87 to the one side of the shell pressure switch 65, the opposite side of which is connected to the one side of the mix pump motor 58. The opposite side of the mix pump motor 58 is connected directly to the neutral or return line 81. Thus, with the switch 60 in the automatic or closed position, power is directly connected across the mix pump motor 58 in series with the shell pressure switch 65. The motor will operate until the pressure switch 65 opens indicating the desired transfer of material under the desired pressure to the transfer or freezing cylinder C. The opposite side of the switch 60 and in particular, contact arm 86 is connnected directly in series with the heater control switch 75 to the one side of the primary winding 88 of the heater transformer 40, the opposite side of which primary is connected directly to the neutral or common return line 81. The switch 75 is normally open, thus closure of the switch 60 does not provide power to the transformer 40. However, whenever the draw handle H is actuated to open the discharge valve V, the switch 75 will close and provide power to the transformer primary 88. The transformer is a step-down transformer and with the secondary 89 connected directly across the heater 36. For example, the transformer may reduce the incoming voltage to a lower voltage to provide the desired heating current to the heater 36 which in turn will provide the desired anticipatory heating of the sensor 20. The heating effect will be maintained as long as valve V is open. The heater switch 75 which is controlled by the valve is interlocked through the draw switch 76 to the operation of the compressor motor 64 and the scraper motor 63. Thus, the draw switch 76 and the temperature control 34 is interconnected into the circuit through the toggle switch 50. The illustrated toggle switch is shown as a double pole three position or double throw switch having a pair of contact arms 90 and 91 ganged to each other and to the common toggle 50 for simultaneous positioning between the illustrated off position, scraper operating position, and the automatic position. The contact arms 90 and 91 are connected in common to the power line 80 and thus both are hot contacts for selectively supplying power to the various portions of the circuit as follows. In the "off" position, the contacts remove power from the several related contacts. In the scraper position, the contact arm 90 engages the dead contact, while the contact arm 91 engages a contact 92 which is connected via a lead 93 directly to the one side of the coil 83 of the scraper starter SC. The opposite side of the coil 83 is connected directly to the neutral or return line. Thus with the toggle 50 moved to the scraper position, power is directly applied to the scraper starter winding 83 which will close its contacts and provide power to the scraper motors 63 to permit the previously described independent operation of the scraper. In the alternate or automatic position of the toggle switch 50, the contact arms 90 and 91, respectively engage contacts 94 and 95 to supply power thereto. The contact 94 is connected via a lead 96 to the one side of the draw switch 76. The draw switch 76 is a normally open switch coupled in common with the heater switch 75 to the draw handle H. Thus the circuit from the contact via the lead 96 is normally held open at the draw switch. When the handle is rotated to open the valve, the draw switch 76 will simultaneously close with the heater switch 75 and transfer power therethrough to a line 97. The line 97 is connected to the scraper contact 92 and thus directly to the line 93 which in turn provides power to the coil 83 of the scraper starter SS. This thus provides power to operate the scraper motor 63 whenever the valve V has been opened to withdraw mix from the freezer cylinder C.

The alternate contact 95 of the toggle switch 50 interconnects the temperature control into the circuit and in particular, the temperature control switch 98 which is controlled by the expansion and contraction of the fluid within the sensor bulb 20. Thus, the contact 95 is connected via a lead 99 to the one side of the switch 98, the opposite side of which is connected via a lead 100 to the winding 82 of the compressor starter CS. The opposite side of the winding 82 is connected directly to the neutral line 81. Thus the winding 82 of the compressor starter CS is connected into the circuit through the automatic position of the toggle switch 50 in series with the temperature control contacts or switch 98, of the temperature control 34. The compressor motor 64 will therefore be driven whenever the temperature sensor or controller closes the switch 98 to provide the desired power to the compressor starter CS and only until such a time as the sensor indicates that the mix is below the desired discharge temperature. The sensing is of course modified by the heating provided by the high resistance wire 36 during the discharge.

In addition, a lead 101 interconnects the winding 83 of the scraper starter to the hot side of the compressor motor 64. Consequently, whenever the compressor starter CS is actuated to energize the motor 64, it will also energize the scraper starter SS and provide for the simultaneous rotation of the scraper motor 63. This will insure the removal of the material adjacent the surface any time the cylinder is being cooled to lower the temperature of the mix within the cylinder C.

The scraper 3 is in effect a slave to the refrigerant compressor, that is to say, when the compressor goes on, the scraper goes on automatically. However, the scraper 3 can also rotate independently for a cleaning out operation when it is not desired to continue refrigeration. Furthermore, the scraper could be inoperative and it would still be possible to remove the product from the cylinder because of the pressurization thereof.

The operation of the unit is as follows.

Assuming that the machine is tight, that is the serving valve V is closed, and the door and pump assembly sealed. The product mix would be poured into the tank T and the pump switch 60 turned on to the automatic position. When the pump P stops running, the pressure in the cylinder C has risen to the operating pressure. Then the other toggle switch 50 on the front of the machine would be moved to the automatic refrigeration position which starts the freezing cycle with a supply of cooling to the cylinder C and which also turns the scraper 3 on. The machine is then on the automatic position, after which 15 to 20 minutes are required to lower the cylinder temperature and the mix within the cylinder to the proper operating temperature at which time switch 98 opens to shut down the compressor motor 64 and the scraper motor 63.

If, thereafter, the cylinder temperature adjacent the discharge end decreases, the switch 98 again closes and recycles the motors to again raise the mix to the desired temperature.

The operation of the draw off valve V is as follows. Assume the operator wishes to make a draw and he opens the draw off valve. This permits the plunger 70 to extend outwardly under the force of spring 73, thereby closing the two micro-switches 74 and 75. The micro-switches respectively energize the scraper motor 63 and simultaneously provides power via the transformer 40 to the heater 36. If the heater 36 is on for a sufficiently long period of time, that is if more than one product serving is made for example, then the heater 36 acts to heat the sensor thermobulb 20 sufficiently to actuate the switch 98 and turn on the refrigerating compressor motor 64 through closure of starter CS. If the product temperature is still at the desired degree of coldness, the heater element 36 cools off rapidly after the draw off valve V is closed and thereby turns the scraper motor 63 and compressor motor 64 off.

Referring again to the pressure switch assembly SA, its switch 65 is closed when the pressure in the cylinder C has dropped below the operating pressure and to a selected level. The pressure pump P again raises the pressure level to a selected maximum operating level, the switch 65 opens, and stops motor 58. The pressure switch 65 and pump P are independent of the control system as long as the pump switch 60 is on the pump automatic position.

With the present invention, the sensor 20 is also being heated even though refrigerant is being supplied. This has the advantage of insuring that when the unit is running and a considerable amount of product is being drawn, the refrigerant compressor will not turn off in the event a colder batch of the product located in the center of the cylinder happens to move to the front of the cylinder, thereby cooling down the sensor 20. With the present control system, the refrigerant compressor motor 64 will not shut off because the sensor is being heated.

In order to clean the machine after a days operation for example, the toggle switch 60 would be moved to the off position and the toggle switch 50 would be moved to the scraper position, thereby permitting draw off of all of the remaining product from the cylinder C.

I claim:

1. In a freezer apparatus including a freezer cylinder adapted to discharge finished products out of one end and having a manually operated valve means including a pivoted handle, a mix tank associated with said freezing cylinder, a mix pump adapted to transfer the mix from the tank to the freezing cylinder and simultaneously mixing air therewith to form an aerated mix, a scraper rotatably mounted within said freezing cylinder and revolvable about the inner surface to scrape the mix from the surface of the freezing cylinder, a refrigerant means associated with said freezing cylinder for reducing the temperature of the aerated mix to a preselected temperature, a temperature sensing element mounted adjacent the discharge end of the freezing cylinder and providing a signal proportional to the temperature of the discharging frozen mix, a preheater associated with said sensing means, and circuit means connected to actuate said mix pump, said scraper, said refrigerant supplying means and said heater, said circuit means including a pair of draw related actuated switches including a heater switch and a draw switch, a switch operator coupled to said pivoted handle to simultaneously close and open said switches, a manually operable on-off switch for simultaneously providing power to the mix pump and to said heater switch; said circuit including a pressure switch mounted in the freezing cylinder and connected in the circuit to the mix pump to maintain operation of the mix pump until a predetermined mix pressure is established within the freezing cylinder, said circuit including a freezing cylinder control switch including a first position to directly drive the scraper and a second position providing power to the temperature control sensing means and to the draw switch, said temperature control sensing means being connected to simultaneously energize said refrigerant supplying means and said scraper, and said draw switch being connected to directly actuate said scraper.

2. The freezer apparatus of claim 1 wherein said switch operator includes a rod member slideably mounted with one end engaging said handle, a spring means urging said rod member toward said handle, said rod member having a laterally extended element, and said draw related switches are mounted in stacked relation with aligned input elements in the path of said extended element for actuation in response to movement of said handle to a withdrawn position.

* * * * *